United States Patent
Chiang et al.

(10) Patent No.: US 12,234,576 B2
(45) Date of Patent: Feb. 25, 2025

(54) PHOTOCHROMIC THERMAL INSULATION FIBER AND MANUFACTURING METHOD THEREOF

(71) Applicant: TAIWAN TEXTILE RESEARCH INSTITUTE, New Taipei (TW)

(72) Inventors: Jo-Cheng Chiang, New Taipei (TW); Chao-Huei Liu, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 317 days.

(21) Appl. No.: 17/697,531

(22) Filed: Mar. 17, 2022

(65) Prior Publication Data

US 2022/0389619 A1 Dec. 8, 2022

(30) Foreign Application Priority Data

May 28, 2021 (TW) .................................. 110119573

(51) Int. Cl.
| | | |
|---|---|---|
| *D01F 1/06* | (2006.01) | |
| *C08J 3/22* | (2006.01) | |
| *C08L 23/12* | (2006.01) | |
| *D01D 1/04* | (2006.01) | |
| *D01D 5/10* | (2006.01) | |
| *D01F 1/10* | (2006.01) | |
| *D01F 8/06* | (2006.01) | |

(52) U.S. Cl.
CPC ...... *D01F 1/06* (2013.01); *C08J 3/22* (2013.01); *C08L 23/12* (2013.01); *D01D 1/04* (2013.01); *D01D 5/10* (2013.01); *D01F 1/10* (2013.01); *D01F 8/06* (2013.01); *D10B 2321/022* (2013.01); *D10B 2401/20* (2013.01)

(58) Field of Classification Search
CPC ...... D01F 1/06; D01F 1/10; D01F 8/06; C08J 3/22; C08L 23/12; D01D 1/04; D01D 5/10; D10B 2321/022; D10B 2401/20
See application file for complete search history.

(56) References Cited

U.S. PATENT DOCUMENTS

| | | | |
|---|---|---|---|
| 5,932,309 A * | 8/1999 | Smith .................. | D01F 8/12 428/474.7 |
| 7,452,611 B2 | 11/2008 | Blackburn et al. | |
| 9,200,386 B2 | 12/2015 | Chiang et al. | |
| 9,528,004 B2 | 12/2016 | Ribi | |
| 2003/0158284 A1 * | 8/2003 | Zheng ................. | C08F 222/102 522/75 |
| 2014/0335329 A1 * | 11/2014 | Abayasinghe ....... | C09D 127/06 427/160 |
| 2015/0329996 A1 * | 11/2015 | Hahm ...................... | D02G 3/44 428/221 |
| 2018/0196165 A1 | 7/2018 | Chiang | |
| 2021/0324543 A1 | 10/2021 | Chiang et al. | |

FOREIGN PATENT DOCUMENTS

| | | |
|---|---|---|
| CN | 103556300 A | 2/2014 |
| CN | 103556276 B | 10/2015 |
| CN | 106319685 A | 1/2017 |
| CN | 109402780 A | 3/2019 |
| CN | 110528116 A | 12/2019 |
| JP | 04202811 A * | 7/1992 |
| JP | H07189018 A | 7/1995 |
| JP | 2001207326 A | 8/2001 |
| KR | 100846665 B1 | 7/2008 |
| TW | 200512281 A | 4/2005 |
| TW | I293343 B | 2/2008 |
| TW | 201234987 A1 | 9/2012 |
| TW | 201718960 A | 6/2017 |
| TW | 202037703 A | 10/2020 |
| WO | 2005030856 A1 | 4/2005 |

OTHER PUBLICATIONS

English translation of JP4202811 to Yamada obtained from Espacenet database (Year: 1992).*
Little, Anna F. et al., "Textile applications of commercial photochromic dyes. Part 6: photochromic polypropylene fibres", Coloration Technology, vol. 132, No. Jun. 29, 2016 (Jun. 29, 2016), pp. 304-309, ISSN: 1472-3581 DOI: 16.1111/cote.12221.
Homola, Timothy J, "Photochromic Plastic Stabilization and Matrix Interactions", Molecular Crystals and Liquid Crystals, vol. 344, No. 1, Jun. 2000 (Jun. 1, 2000), pp. 63-68, ISSN: 1058-725X, DOI: 10.1080/10587250008023815.
Kamata, Kazuhiro et al., "Photochromic polyolefin fibers exhibiting no dioxin evolution and blooming comprising polyolefin fibers containing organic photochromic compounds with molecular weight .gtoreq.300", XP002803843, retrieved from STN Database accession No. 2001:563792.

* cited by examiner

*Primary Examiner* — Jeremy R Pierce
(74) *Attorney, Agent, or Firm* — McClure, Qualey & Rodack, LLP

(57) ABSTRACT

The present disclosure provides a photochromic thermal insulation fiber including a core layer and a sheath layer covering the core layer. The core layer includes about 99 parts by weight to 100 parts by weight of polypropylene and about 0.4 parts by weight to 0.6 parts by weight of a photochromic dye. The sheath layer includes about 98 parts by weight to 99 parts by weight of nylon and about 1 part by weight to 2 parts by weight of a near-infrared reflecting dye.

5 Claims, No Drawings

PHOTOCHROMIC THERMAL INSULATION FIBER AND MANUFACTURING METHOD THEREOF

CROSS-REFERENCE TO RELATED APPLICATION

This application claims priority to Taiwan Application Serial Number 110119573, filed on May 28, 2021, which is herein incorporated by reference in its entirety.

BACKGROUND

Field of Invention

The present disclosure relates to a photochromic fiber. More particularly, the present disclosure relates to a photochromic fiber with thermal insulation function and a manufacturing method of the photochromic fiber.

Description of Related Art

A photochromic fiber is a fiber which can change its color under the light. The photochromic fiber can change its color under a specific wavelength of the light, while it reversibly returns to its original color under another wavelength of light (or heat). The photochromic fiber is mainly applied in entertainment clothing, safety clothing, decoration, anti-counterfeiting labels, and so on. However, the existing manufacturing methods are quite complicated, and the produced photochromic fiber without the thermal insulation function is hard to be applied in outdoor clothing.

SUMMARY

The present disclosure provides a photochromic thermal insulation fiber and a manufacturing method of the photochromic thermal insulation fiber. The photochromic thermal insulation fiber may provide the effect of ultraviolet-chromic, ultraviolet protection, and thermal insulation to the fabrics.

According to one aspect of the present disclosure, a photochromic thermal insulation fiber includes a core layer and a sheath layer covering the core layer. The core layer includes about 99 parts by weight to 100 parts by weight of polypropylene and about 0.4 parts by weight to 0.6 parts by weight of a photochromic dye. The sheath layer includes 98 parts by weight to 99 parts by weight of nylon and 1 part by weight to 2 parts by weight of a near-infrared reflecting dye.

In one embodiment of the present disclosure, the photochromic thermal insulation fiber includes 40 parts by weight to 60 parts by weight of the core layer and 40 parts by weight to 60 parts by weight of the sheath layer.

In one embodiment of the present disclosure, the near-infrared reflecting dye is nickel antimony titanium yellow dye.

In one embodiment of the present disclosure, the sheath layer further includes 0.1 parts by weight to 0.2 parts by weight of an ultraviolet absorber.

In one embodiment of the present disclosure, the ultraviolet absorber and the photochromic dye have different absorption spectrums from each other.

In one embodiment of the present disclosure, the sheath layer further includes 0.5 parts by weight to 1 part by weight of titanium dioxide.

According to one aspect of the present disclosure, a manufacturing method of a photochromic thermal insulation fiber includes the following steps. The preparation of a photochromic masterbatch includes uniformly mixing 5 parts by weight of a photochromic dye and 95 parts by weight of polypropylene, and performing a powder refining process, a powder dispersion process, and a kneading and granulation process to obtain the photochromic masterbatch. The preparation of a near-infrared reflecting masterbatch includes uniformly mixing 15 parts by weight of a near-infrared reflecting dye and 85 parts by weight of nylon, and performing a powder refining process, a powder dispersion process, and a kneading and granulation process to obtain the near-infrared reflecting masterbatch. The preparation of a first mixture includes mixing 10 parts by weight of the photochromic masterbatch and 75 parts by weight to 115 parts by weight of polypropylene to obtain the first mixture. The preparation of a second mixture includes mixing 10 parts by weight of the near-infrared reflecting masterbatch and 65 parts by weight to 140 parts by weight of nylon to obtain the second mixture. A core-sheath melt spinning process is performed with the first mixture and the second mixture to form a core layer and a sheath layer of the photochromic thermal insulation fiber, where the first mixture forms the core layer and the second mixture forms the sheath layer.

In one embodiment of the present disclosure, the manufacturing method of the photochromic thermal insulation fiber further includes the following steps. The preparation of an ultraviolet absorber masterbatch includes uniformly mixing 10 parts by weight of an ultraviolet absorber and 90 parts by weight of nylon, and performing a powder refining process, a powder dispersion process, and a kneading and granulation process to obtain the ultraviolet absorber masterbatch. In the preparation of the second mixture, adding 1.5 parts by weight to 3 parts by weight of the ultraviolet absorber masterbatch to obtain the second mixture.

In one embodiment of the present disclosure, the manufacturing method of the photochromic thermal insulation fiber further includes the following steps. The preparation of a titanium dioxide masterbatch includes uniformly mixing 30 parts by weight of titanium dioxide and 70 parts by weight of nylon, and performing a powder refining process, a powder dispersion process, and a kneading and granulation process to obtain the titanium dioxide masterbatch. In the preparation of the second mixture, adding 2.5 parts by weight to 5 parts by weight of the titanium dioxide masterbatch to obtain the second mixture.

In one embodiment of the present disclosure, the preparation of the photochromic masterbatch further includes uniformly mixing 0.1 parts by weight to 0.3 parts by weight of a dispersant with the photochromic dye and the polypropylene to obtain the photochromic masterbatch.

According to the above mentioned embodiments of the present disclosure, the photochromic thermal insulation fiber formed by the core-sheath melt spinning process includes a core layer and a sheath layer, where the core layer of the photochromic thermal insulation fiber includes the photochromic dye, and its sheath layer includes the near-infrared reflecting dye. Therefore, the photochromic thermal insulation fiber provides both the effects of absorbing ultraviolet light and reflecting near-infrared light, which leads to the function of ultraviolet-chromic, ultraviolet protection, and thermal insulation of the fabric including the photochromic thermal insulation fiber.

DETAILED DESCRIPTION

The following disclosure provides many different embodiments, or examples, for implementing different features of the provided subject matter. Specific examples of components, values, arrangements, etc., are described below to simplify the present disclosure. These are, of course, merely examples and are not intended to be limiting.

The present disclosure provides a photochromic thermal insulation fiber and a manufacturing method of the photochromic thermal insulation fiber, where the photochromic thermal insulation fiber includes a core layer and a sheath layer formed by a core-sheath melt spinning process. The core layer of the photochromic thermal insulation fiber includes a photochromic dye, and the sheath layer of the photochromic thermal insulation fiber includes a near-infrared reflecting dye so that the photochromic thermal insulation fiber has the function of absorbing the ultraviolet light and reflecting the near-infrared light. As a result, the fabric including the photochromic thermal insulation fiber has the function of ultraviolet-chromic, ultraviolet protection, and thermal insulation and is able to be applied in the outdoor clothing.

According to some embodiments of the present disclosure, the photochromic thermal insulation fiber includes a core layer and a sheath layer covering the core layer, where the core layer includes polypropylene and a photochromic dye, and the sheath layer includes nylon and a near-infrared reflecting dye. Specifically, the core layer includes 99 parts by weight to 100 parts by weight of the polypropylene and 0.4 parts by weight to 0.6 parts by weight of the photochromic dye so that the photochromic thermal insulation fiber has the effect of absorbing the ultraviolet light. The sheath layer includes 98 parts by weight to 99 parts by weight of the nylon and 1 part by weight to 2 parts by weight of the near-infrared reflecting dye so that the photochromic thermal insulation fiber is able to reflect the near-infrared light. The following description will respectively provide more details of the core layer and the sheath layer of the photochromic thermal insulation fiber.

The base material of the core layer of the photochromic thermal insulation fiber may be polypropylene (PP) so that the photochromic thermal insulation fiber has the characteristics of high impact resistance, tough mechanical properties, and resistance to a variety of organic solvents and acid-base corrosion. In addition, the polypropylene has low moisture content so that the polypropylene may prevent the moisture from affecting the physical and mechanical properties of the photochromic thermal insulation fiber. Therefore, the core layer including the polypropylene may have advantage in the subsequent spinning processing of the photochromic thermal insulation fiber. It should be noted that, in some embodiments, the spinning processing temperature of the polypropylene may be consistent with the temperature range which the photochromic dye in the core layer can withstand so that the photochromic dye in the subsequent polypropylene spinning process could maintain its property. In other words, the core layer with polypropylene as its base material may keep the photochromic dye stable in the spinning process.

The photochromic dye in the core layer of the photochromic thermal insulation fiber can absorb the energy of the ultraviolet under the ultraviolet light or sunlight, thereby changing its molecular structure and so as its color. In contrast, when the photochromic dye releases the energy from the ultraviolet, the photochromic dye returns to its original molecular structure and original color. Since the core layer of the photochromic thermal insulation fiber is able to absorb ultraviolet light, the fabric formed of the photochromic thermal insulation fiber may have the function of ultraviolet-chromic and ultraviolet protection. It should be noted that the core layer of the photochromic thermal insulation fiber includes appropriate amount of the photochromic dye so that the photochromic dye may not affect the process of the photochromic thermal insulation fiber. Specifically, if the core layer of the photochromic thermal insulation fiber includes more than 0.6 parts by weight of the photochromic dye, it may reduce the spinnability of the polypropylene in the core layer and becomes difficult to form the photochromic thermal insulation fiber by spinning. It the core layer includes less than 0.4 parts by weight of the photochromic dye, it may reduce the effect of absorbing ultraviolet light and changing color of the photochromic thermal insulation fiber.

In some embodiments, the above mentioned photochromic dye may include spirooxazine and derivatives thereof. In some embodiments, the photochromic dye may include spiroyarn and derivatives thereof. For example, the photochromic dye may be a photochromic dye that changes to purple under the ultraviolet light or sunlight, such as product NCC #12 purchased from Chong-Yue Co., Ltd.

In some embodiments, the photochromic dye may have a structure represented by the following formula (I) or formula (II):

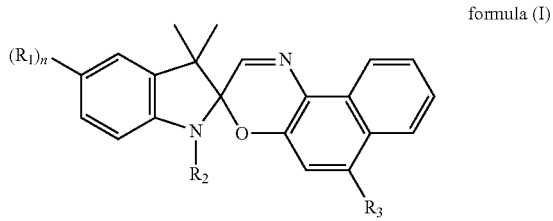

formula (I)

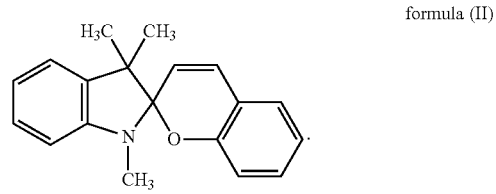

formula (II)

In formula (I), each $R_1$ includes —H, —Br, —N$_2$O, $C_1$-$C_6$ alkyl, or $C_1$-$C_6$ alkoxy; n is an integer from 1 to 3, when n is equal to or greater than 2, two or more $R_1$ may be connected to each other to form a $C_6$-$C_{10}$ aromatic ring; $R_2$ includes —H or $C_1$-$C_6$ alkyl; and $R_3$ includes —H, imino group, or 5-membered or 6-membered nitrogen-containing heterocyclic group.

Specifically, the photochromic dye may have a structure represented by any one of formula (I-1) to formula (I-10):

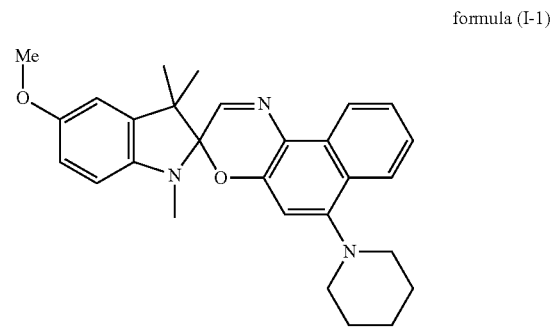

formula (I-1)

formula (I-2)

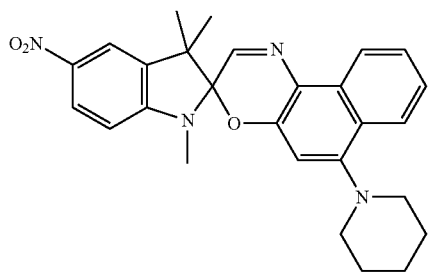

formula (I-3)

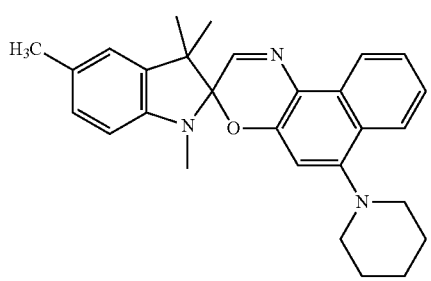

formula (I-4)

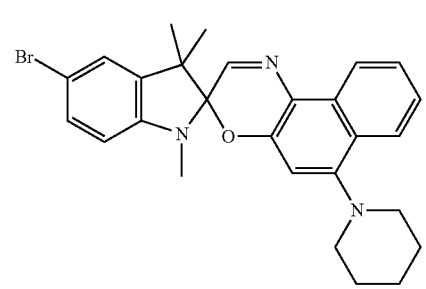

formula (I-5)

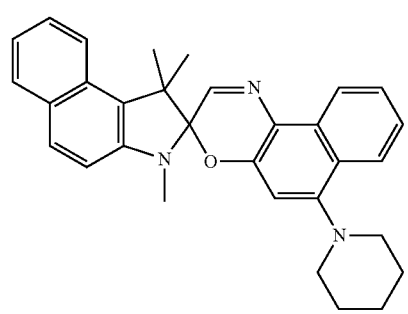

formula (I-6)

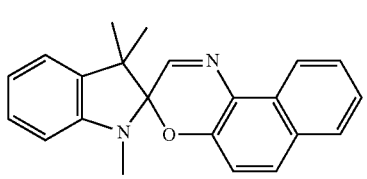

formula (I-7)

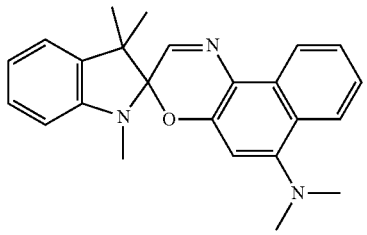

formula (I-8)

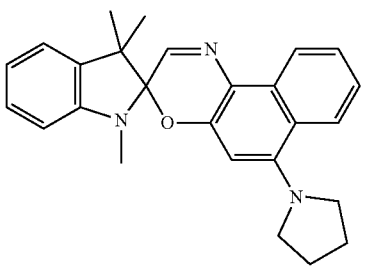

formula (I-9)

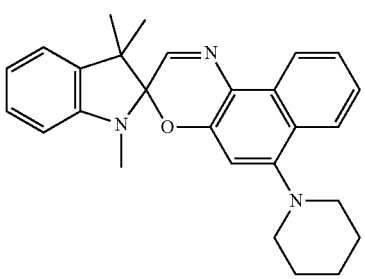

formula (I-10)

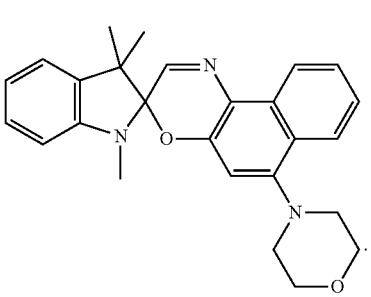

On the other hand, the base material of the sheath layer of the photochromic thermal insulation fiber may be nylon, or referred as polyamide (PA), so that the photochromic thermal insulation fiber has the characteristics of high gloss surface, high malleability, high abrasion resistance, and well softness. In addition, the nylon with high moisture content may increase the hydrophilicity of the photochromic thermal insulation fiber. Therefore, the sheath layer including the nylon may improve the wearing comfort of the fabric formed of the photochromic thermal insulation fiber.

The near-infrared reflecting dye in the sheath layer of the photochromic thermal insulation fiber can reflect the near-infrared wavelength under the near-infrared light or sunlight, thereby preventing the photochromic thermal insulation fiber from absorbing the near-infrared light and accumulating energy thereof. As a result, the fabric formed of the photochromic thermal insulation fiber has the function of thermal insulation, which improves the wearing comfort of the fabric. In some embodiments, the near-infrared reflecting dye may include dye color with well photostability. For example, the near-infrared reflecting dye may be nickel antimony titanium yellow dye (($Ti,Ni,Sb)O_2$), such as product V-9415 purchased from Ferro Corporation. It should be noted that the sheath layer of the photochromic thermal insulation fiber includes appropriate amount of the near-infrared reflecting dye so that the near-infrared reflecting dye may not affect the process of the photochromic thermal insulation fiber. Specifically, if the sheath layer of the photochromic thermal insulation fiber includes more than 2 parts by weight of the near-infrared reflecting dye, it may reduce the spinnability of the nylon in the sheath layer and becomes difficult to form the photochromic thermal insulation fiber by spinning. If the sheath layer includes less than 1 part by weight of the near-infrared reflecting dye, it may reduce the effect of reflecting near-infrared light of the photochromic thermal insulation fiber.

In some embodiments, the sheath layer of the photochromic thermal insulation fiber may further include about 0.1 parts by weight to 0.2 parts by weight of an ultraviolet absorber. The ultraviolet absorber is able to convert the partial wavelengths of the ultraviolet light into heat or non-destructive long light waves and release them, thereby avoiding yellowing, reduced gloss and weakened physical properties caused by a portion of the ultraviolet light. It should be noted that the sheath layer of the photochromic thermal insulation fiber includes appropriate amount of the ultraviolet absorber so that the ultraviolet absorber may not affect the process of the photochromic thermal insulation fiber. Specifically, if the sheath layer of the photochromic thermal insulation fiber includes more than 0.2 parts by weight of the ultraviolet absorber, it may reduce the spinnability of the nylon in the sheath layer and becomes difficult to form the photochromic thermal insulation fiber by spinning.

In some embodiments, the ultraviolet absorber and the photochromic dye may have different absorption spectrums from each other. As a result, the ultraviolet absorber may not absorb the required light wavelength range for the photochromic dye changing its color, such that the ultraviolet absorber in the sheath layer can help the photochromic dye in the core layer maintain its ability and stability for color change. For example, the light wavelength absorbed by the ultraviolet absorber may be between 240 nm and 320 nm, while the light wavelength absorbed by the photochromic dye may be between 300 nm and 380 nm.

In some embodiments, the above mentioned ultraviolet absorber may include triazine ultraviolet absorber. For example, the ultraviolet absorber may include 2-(4,6-Diphenyl-1,3,5-triazin-2-yl)-5-hexyloxy-phenol with a chemical structure as

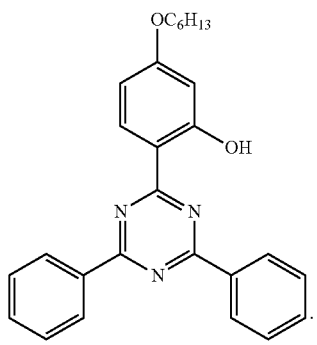

In some embodiments, the molecular weight of the ultraviolet absorber may be 425. Specifically, the ultraviolet absorber may be, for example, product Eversorb 41 FD purchased from Everlight Chemical.

In some embodiments, the sheath layer of the photochromic thermal insulation fiber may further include about 0.5 parts by weight to 1 part by weight of titanium dioxide, such as product B160509-0253 purchased from Auspring Co., Ltd. The titanium dioxide in the sheath layer of the photochromic thermal insulation fiber is able to reflect few of near-infrared light, thereby improving the thermal insulation effect of the photochromic thermal insulation fiber. Moreover, the titanium dioxide in the sheath layer could increase the whiteness of the photochromic thermal insulation fiber, which improves the color rendering property of the photochromic thermal insulation fiber. It should be noted that the sheath layer of the photochromic thermal insulation fiber includes appropriate amount of the titanium dioxide so that the titanium dioxide may not affect the process of the photochromic thermal insulation fiber. Specifically, if the sheath layer of the photochromic thermal insulation fiber includes more than 1 part by weight of the titanium dioxide, it may reduce the spinnability of the nylon in the sheath layer and becomes difficult to form the photochromic thermal insulation fiber by spinning.

In some embodiments, the photochromic thermal insulation fiber may have appropriate ratio of the core layer and the sheath layer to prevent the dimensional stability or some physical mechanical properties from being deteriorated by the double-layer structure of the photochromic thermal insulation fiber. Specifically, the photochromic thermal insulation fiber may include, for example, about 40 parts by weight to 60 parts by weight of the core layer and about 40 parts by weight to 60 parts by weight of the sheath layer so that the shrinkage in boiling water of the photochromic thermal insulation fiber is from 3% to 4%. In a preferred embodiment, the photochromic thermal insulation fiber may have about 50 parts by weight of the core layer and about 50 parts by weight of the sheath layer. In some embodiments, the ratio of the cross-sectional area of the core layer and the sheath layer of the photochromic thermal insulation fiber may be from 40:60 to 60:40, and 50:50 is preferred.

The exemplary structures or product models of each component listed above are for illustrative purposes only and are not intended to limit the present disclosure. Other structures or other product models may also be used for each component, as long as the photochromic thermal insulation fiber of the present disclosure can be prepared.

According to some embodiments of the present disclosure, a manufacturing method of the photochromic thermal insulation fiber includes the following steps. First, the preparation of the photochromic masterbatch includes uniformly mixing 5 parts by weight of a photochromic dye and 95 parts by weight of polypropylene and performing a powder refining process, a powder dispersion process, and a kneading and granulation process to obtain the photochromic masterbatch. Specifically, the powder refining process may be dry grinding, the particle sizes of the photochromic dye and the polypropylene are ground to about 300 nm to 400 nm, and the operating condition may be grinding at 500 rpm for 3 minutes. The operating condition of the powder dispersion process may be dispersion at 500 rpm for 10 minutes. The kneading temperature of the kneading and granulation process may be about 180° C. to 200° C., and the screw speed may be about 200 rpm.

In some embodiments, the preparation of the photochromic masterbatch may further include uniformly mixing 0.1 parts by weight to 0.3 parts by weight of a dispersant with the above-mentioned amount of photochromic dye and polypropylene to obtain the photochromic masterbatch. For example, the dispersant may include a first solid dispersant. In some embodiments, the first solid dispersant may be, for example, product D 1377E purchased from EMS-Griltex.

Then, the preparation of the near-infrared reflecting masterbatch includes uniformly mixing 15 parts by weight of a near-infrared reflecting dye and 85 parts by weight of nylon, and performing a powder refining process, a powder dispersion process, and a kneading and granulation process to obtain the near-infrared reflecting masterbatch. Specifically, the powder refining process may be dry grinding, the particle sizes of the near-infrared reflecting dye and the nylon are ground to about 300 nm to 400 nm, and the operating condition may be grinding at 500 rpm for 3 minutes. The operating condition of the powder dispersion process may be dispersion at 500 rpm for 10 minutes. The kneading temperature of the kneading and granulation process may be about 240° C. to 260° C., and the screw speed is about 200 rpm.

In some embodiments, the preparation of the near-infrared reflecting masterbatch may further include uniformly mixing about 0.1 parts by weight to 0.3 parts by weight of a dispersant with the above-mentioned amount of the near-infrared reflecting dye and nylon to obtain the near-infrared reflecting masterbatch. For example, the dispersant may include a second solid dispersant. In some embodiments, the second solid dispersant may be, for example, product D 1556A purchased from EMS-Griltex.

Then, the preparation of a first mixture includes mixing 10 parts by weight of the photochromic masterbatch and 75 parts by weight to 115 parts by weight of polypropylene to obtain the first mixture. Specifically, the photochromic masterbatch and the polypropylene are mixed uniformly and heated to about 105° C. for drying to obtain the first mixture.

Then, the preparation of a second mixture includes mixing 10 parts by weight of the near-infrared reflecting masterbatch and 65 parts by weight to 140 parts by weight of nylon to obtain the second mixture. Specifically, the near-infrared reflecting masterbatch and the nylon are mixed uniformly and heated to about 105° C. for drying to obtain the second mixture.

Afterwards, a core-sheath melt spinning process is performed with the first mixture and the second mixture to form a core layer and a sheath layer of the photochromic thermal insulation fiber. Specifically, the first mixture and the second mixture are respectively delivered into a presser through a first feeding port and a second feeding port to form a melting state. Subsequently, the two mixtures are spun out by a two-coaxial nozzle at the same time and cooled, where the first mixture passes through the inner nozzle, and the second mixture passes through the outer nozzle. As a result, the first mixture and the second mixture are respectively formed into the core layer and the sheath layer of the photochromic thermal insulation fiber. In some embodiments, the spin temperature of the core-sheath melt spinning process may be between 215° C. and 270° C., and the wind speed may be 2500 m/min.

In some embodiments, the manufacturing method of the photochromic thermal insulation fiber may further include preparing an ultraviolet absorber masterbatch. The preparation of an ultraviolet absorber masterbatch includes uniformly mixing 10 parts by weight of an ultraviolet absorber and 90 parts by weight of nylon, and performing a powder refining process, a powder dispersion process, and a kneading and granulation process to obtain the ultraviolet absorber masterbatch. Subsequently, in the preparation of the second mixture, 1.5 parts by weight to 3 parts by weight of the ultraviolet absorber masterbatch is added to obtain the second mixture. Specifically, the powder refining process may be dry grinding, the particle sizes of the ultraviolet absorber and the nylon are ground to about 300 nm to 400 nm, and the operating condition may be grinding at 500 rpm for 3 minutes. The operating condition of the powder dispersion process may be dispersion at 500 rpm for 10 minutes. The kneading temperature of the kneading and granulation process may be about 240° C. to 260° C., and the screw speed may be about 200 rpm. In some embodiments, the preparation of the ultraviolet absorber masterbatch may further include uniformly mixing about 0.1 parts by weight to 0.3 parts by weight of a dispersant with the above-mentioned amount of the ultraviolet absorber and the nylon to obtain the ultraviolet absorber masterbatch.

In some embodiments, the manufacturing method of the photochromic thermal insulation fiber may further include preparing a titanium dioxide masterbatch. The preparation of the titanium dioxide masterbatch includes uniformly mixing 30 parts by weight of titanium dioxide and 70 parts by weight of nylon, and performing a powder refining process, a powder dispersion process, and a kneading and granulation process to obtain the titanium dioxide masterbatch. Subsequently, in the preparation of the second mixture, 2.5 parts by weight to 5 parts by weight of the titanium dioxide masterbatch is added to obtain the second mixture. Specifically, the powder refining process may be dry grinding, the particle sizes of the titanium dioxide and the nylon are ground to about 300 nm to 400 nm, and the operating condition may be grinding at 500 rpm for 3 minutes. The operating condition of the powder dispersion process may be dispersion at 500 rpm for 10 minutes. The kneading temperature of the kneading and granulation process may be about 240° C. to 260° C., and the screw speed may be about 200 rpm. In some embodiments, the preparation of the titanium dioxide masterbatch may further include uniformly mixing about 0.1 parts by weight to 0.3 parts by weight of a dispersant with the above-mentioned amount of the titanium dioxide and the nylon to obtain the titanium dioxide masterbatch.

In the following descriptions, a variety of measurements and evaluations were performed for the photochromic thermal insulation fiber of the present disclosure. Herein, experiments 1 to 3 are referred to illustrate the features of the present disclosure more specifically.

Experiment 1: Basic Recipe and Spinnability Evaluation of Photochromic Thermal Insulation Fiber In this experiment, the spinnability evaluation was performed for the fiber of each comparative example and the photochromic thermal insulation fiber of each example. Specifically, the photochromic masterbatch, the near-infrared reflecting masterbatch, the ultraviolet absorber masterbatch, and the titanium dioxide masterbatch were first prepared according to the masterbatch recipe in Table 1 below. The samples of these masterbatches all successfully passed through the 40 μm filter test, which indicates the good dispersion characteristic of the masterbatches would not affect the subsequent processes.

TABLE 1

|  | Photochromic masterbatch | Near-infrared reflecting masterbatch | Ultraviolet absorber masterbatch | Titanium dioxide masterbatch |
|---|---|---|---|---|
| Polypropylene | 94.9 | — | — | — |
| Photochromic dye | 5 | — | — | — |
| Nylon | — | 84.9 | 89.9 | 70 |
| Near-infrared reflecting dye | — | 15 | — | — |
| Ultraviolet absorber | — | — | 10 | — |
| Titanium dioxide | — | — | — | 30 |

TABLE 1-continued

| | Photo-chromic masterbatch | Near-infrared reflecting masterbatch | Ultraviolet absorber masterbatch | Titanium dioxide masterbatch |
|---|---|---|---|---|
| Dispersant (A) | 0.1 | — | — | — |
| Dispersant (B) | — | 0.1 | 0.1 | — |

Remark 1: The units were all parts by weight.
Remark 2: The photochromic dye was product NCC#12 purchased from Chong-Yue Co., Ltd.
Remark 3: The near-infrared reflecting dye was product V-9415 purchased from Ferro Corporation.
Remark 4: The ultraviolet absorber was product Eversorb 41FD purchased from Everlight Chemical.
Remark 5: The titanium dioxide was product B160509-0253 purchased from Auspring Co., Ltd.
Remark 6: The dispersant (A) was product D 1377E purchased from EMS-Griltex.
Remark 7: The dispersant (B) was product D 1556A purchased from EMS-Griltex.

The components and their usage amount for manufacturing the fiber of each comparative example and each example were listed in Table 2 below, and then the above-mentioned core-sheath melt spinning process was applied to the components to observe the spinnability thereof. It should be noted that the fibers were all in core-sheath shape formed from two mixtures. As shown in Table 2, all the fiber of each comparative example and the photochromic thermal insulation fiber of each example had good spinnability.

TABLE 2

| | First mixture | | Second mixture | | | | |
|---|---|---|---|---|---|---|---|
| | Polypropylene | Photochromic dye | Nylon | Near-infrared reflecting dye | Ultraviolet absorber | Titanium dioxide | Spinnability |
| Comparative Example 1 | 100 | — | 100 | — | — | — | Good |
| Comparative Example 2 | 100 | — | 99 | 1 | — | — | Good |
| Comparative Example 3 | 100 | — | 98 | 2 | — | — | Good |
| Comparative Example 4 | 100 | — | 98.5 | 1 | — | 0.5 | Good |
| Comparative Example 5 | 100 | — | 98 | 1 | — | 1 | Good |
| Comparative Example 6 | 100 | — | 98.4 | 1 | 0.1 | 0.5 | Good |
| Example 1 | 99.5 | 0.5 | 99 | 1 | — | — | Good |
| Example 2 | 99.5 | 0.5 | 98.4 | 1 | 0.1 | 0.5 | Good |
| Example 3 | 99.5 | 0.5 | 98.25 | 1 | — | 0.75 | Good |

Remark 1: The units in the first mixture and the second mixture were all parts by weight.
Remark 2: The photochromic dye was product NCC#12 purchased from Chong-Yue Co., Ltd.
Remark 3: The near-infrared reflecting dye was product V-9415 purchased from Ferro Corporation.
Remark 4: The ultraviolet absorber was product Eversorb 41FD purchased from Everlight Chemical.
Remark 5: The titanium dioxide was product B160509-0253 purchased from Auspring Co., Ltd.

Experiment 2: Ultraviolet Protection Evaluation of Photochromic Thermal Insulation Fiber In this experiment, the ultraviolet protection evaluation was performed on the fiber of each comparative example and the photochromic thermal insulation fiber of each example. Specifically, the fiber of each comparative example and the photochromic thermal insulation fiber of each example of the experiment 1 were formed into the circular knitting garters with a stich density of 320 stiches. Then, each comparative example and each example was irradiated by ultraviolet light to observe its color change effect, and its ultraviolet protection factor (UPF) was measured by the standard method AS/NZS 4399. The results of each comparative example and each example are shown in Table 3.

TABLE 3

| | Color change effect | Ultraviolet protection factor |
|---|---|---|
| Comparative Example 1 | None | 11 |
| Comparative Example 2 | None | 22 |
| Comparative Example 3 | None | 28 |
| Comparative Example 4 | None | 28 |
| Comparative Example 5 | None | 45 |
| Comparative Example 6 | None | 36 |
| Example 1 | Observed | 50 |
| Example 2 | Observed | 50+ |
| Example 3 | Observed | 49 |

As seen from Table 2 and Table 3, the photochromic dye was not added into the core layers of the fibers of comparative example 1 to comparative example 6. As a result, the fabrics of comparative example 1 to comparative example 6 did not change its color under the ultraviolet light and had bad ultraviolet protection effect. In contrast, the core layers of the photochromic thermal insulation fibers of example 1 to example 3 included appropriate amount of the photochromic dye so that the fabrics of example 1 to example 3 showed ultraviolet-chromic effect and well ultraviolet protection effect.

Experiment 3: Thermal Insulation Evaluation of Photochromic Thermal Insulation Fiber In this experiment, the thermal insulation evaluation was performed on the fiber of each comparative example and the photochromic thermal insulation fiber of each example. Specifically, the fiber of each comparative example and the photochromic thermal insulation fiber of each example of the experiment 1 were formed into the circular knitting garters with a stich density of 320 stiches. Then, each circular knitting garter was irradiated by the 500 W near-infrared light (halogen lamp) for 2 minutes under room temperature. The surface temperature of each circular knitting garter was measured to evaluate its thermal insulation effect. The results are shown in Table 4.

TABLE 4

| | Temperature before irradiation (° C.) | Temperature after irradiation (° C.) | Temperature difference (° C.) |
|---|---|---|---|
| Comparative Example 1 | 26.6 | 39.7 | 13.1 |
| Comparative Example 2 | 26.6 | 38.1 | 11.5 |
| Comparative Example 3 | 26.6 | 37.3 | 10.7 |
| Comparative Example 4 | 26.6 | 37.5 | 10.9 |
| Comparative Example 5 | 26.6 | 37.2 | 10.6 |
| Comparative Example 6 | 26.6 | 37.3 | 10.7 |
| Example 1 | 26.6 | 37.9 | 11.3 |
| Example 2 | 26.6 | 37.6 | 11 |
| Example 3 | 26.6 | 37.6 | 11 |

As seen from Table 2 and Table 4, the difference between comparative example 1 and other comparative examples and each example was that the near-infrared reflecting dye was not added into comparative example 1. As a result, the temperature differences before and after the irradiation of near-infrared light of comparative example 2 to comparative example 5 and example 1 to example 3 were all smaller than that of comparative example 1. In details, the temperature differences of example 1 to example 3 were similar to that of comparative example 2, which indicated that the photochromic dye in the photochromic thermal insulation fiber did not affect the near-infrared reflecting dye. Therefore, the fiber including the near-infrared reflecting dye in the sheath layer showed well thermal insulation effect.

In addition, the sheath layer of example 2 and example 3 included the near-infrared reflecting dye and titanium dioxide so that the temperature difference before and after the irradiation of near-infrared light of example 2 and example 3 were smaller than that of example 1. As a result, the photochromic thermal insulation fiber including the near-infrared reflecting dye and titanium dioxide in the sheath layer showed preferred thermal insulation effect.

According to the above-mentioned embodiment of the present disclosure, the photochromic thermal insulation fiber formed by the core-sheath melt spinning process includes the core layer and the sheath layer. The core layer of the photochromic thermal insulation fiber includes appropriate amount of the photochromic dye so that the photochromic thermal insulation fiber may absorb ultraviolet light and change its color. On the other hand, the sheath layer of the photochromic thermal insulation fiber includes appropriate amount of the near-infrared reflecting dye, the titanium dioxide, and the ultraviolet absorber so that the photochromic thermal insulation fiber may reflect near-infrared light and avoid damage from a portion of ultraviolet light. Therefore, the fabric formed of the photochromic thermal insulation fiber can have the function of ultraviolet-chromic, ultraviolet protection, and thermal insulation, which improves the application of the fabric.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A photochromic thermal insulation fiber, comprising:
    a core layer, the core layer comprising:
        99 parts by weight to 100 parts by weight of polypropylene; and
        0.4 parts by weight to 0.6 parts by weight of a photochromic dye; and
    a sheath layer covering the core layer, the sheath layer comprising:
        98 parts by weight to 99 parts by weight of nylon;
        0.1 parts by weight to 0.2 parts by weight of an ultraviolet absorber; and
        1 part by weight to 2 parts by weight of a near-infrared reflecting dye.

2. The photochromic thermal insulation fiber of claim 1, wherein the photochromic thermal insulation fiber comprises 40 parts by weight to 60 parts by weight of the core layer and 40 parts by weight to 60 parts by weight of the sheath layer.

3. The photochromic thermal insulation fiber of claim 1, wherein the near-infrared reflecting dye is nickel antimony titanium yellow dye.

4. The photochromic thermal insulation fiber of claim 1, wherein the ultraviolet absorber and the photochromic dye have different absorption spectrums from each other.

5. The photochromic thermal insulation fiber of claim 1, wherein the sheath layer further comprises 0.5 parts by weight to 1 part by weight of titanium dioxide.

* * * * *